Z. Ina Doolittle & A. M. Crowder.
Cotton-Seed Planter.

No. 74,518.

PATENTED FEB 18 1868

Witnesses:
Theo. Inseke
J. A. Fraser

Inventors:
Z. Doolittle
A. M. Crowder
Per Munn & Co.
Attorneys

United States Patent Office.

ZINA DOOLITTLE AND A. M. CROWDER, OF HOUSTON FACTORY, GEORGIA.

Letters Patent No. 74,518, dated February 18, 1868.

IMPROVEMENT IN COTTON-SEED PLANTERS.

The Schedule referred to in these Letters Patent and making part of the same.

TO ALL WHOM IT MAY CONCERN:

Be it known that we, ZINA DOOLITTLE and A. M. CROWDER, of Houston Factory, in the county of Houston, and State of Georgia, have invented a new and improved Cotton-Seed Planter; and we do hereby declare that the following is a full, clear, and exact description thereof, which will enable those skilled in the art to make and use the same, reference being had to the accompanying drawings, forming part of this specification.

This invention relates to a new improved device for planting cotton-seed, and it consists in a peculiar construction and arrangement of parts, as hereinafter fully shown and described, whereby cotton-seed may be planted or distributed from the hopper with certainty, or without the possibility of the seed choking or clogging up the hopper or seed-discharging apertures. In the accompanying sheet of drawings—

Figure 1:
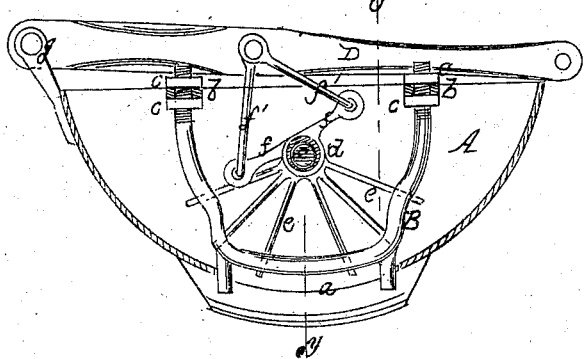
Figure 2:
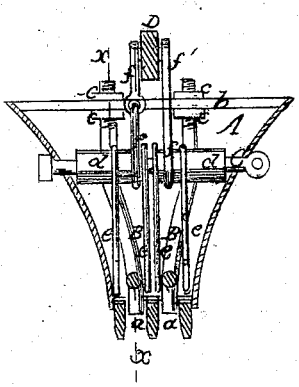

Figure 1 is a side sectional view of my invention, taken in the line $x\,x$, fig. 2.

Figure 2, a transverse vertical section of the same, taken in the line $y\,y$, fig. 1.

Similar letters of reference indicate corresponding parts.

A represents the hopper, the bottom of which is of semicircular form, and has two slots, $a\,a$, made in it parallel with each other. B B are two rods, which are bent or curved so that their lower parts will correspond to the curvature of the slots $a\,a$, said rods extending upward and passing through bars $b\,b$ on the top of the hopper, the upper ends of the rods B, above and below the bars $b$, having screw-nuts, $c$, on them, by turning which the rods B may be adjusted higher or lower, as desired. Transversely through the hopper A, a shaft, C, passes, which has two tubes $d\,d$ placed loosely upon it so that they may turn freely thereon. These tubes have each a number of rods, $e\,e'$, attached radially to them, two rows, $e\,e'$, being attached to each, so as to work at each side of the lower part of the rods B B directly over the slots $a\,a$, as shown clearly in fig. 2. The tubes $d$ have each an arm, $f$, extending from them, which are attached by links $f'$ to a lever, D, one end of which is connected by a hinge or joint, $g$, to one side of the hopper. The arms $f$ and links $f'$ form toggles, which, as the lever D is worked up and down, give an oscillating movement to the tubes $d\,d$ and rods $e\,e'$, the rods of one tube moving in a reverse direction to those of the other, and insuring the discharge of the seed through the slots $a\,a$, preventing the choking or clogging of the seed. The amount of seed discharged on a given area of ground may be regulated by adjusting the rods B higher or lower, the latter being directly over the slots $a\,a$, and the seed passing down each side of the rods B, and underneath the same, through the slots $a$.

We claim as new, and desire to secure by Letters Patent—

1. The adjustable rods B B, in combination with the slots $a\,a$ in the bottom of the hopper A, substantially as and for the purpose specified.

2. The oscillating rods $e\,e'$, in combination with the adjustable rods B B and the slots $a\,a$, all arranged substantially as and for the purpose set forth.

3. Operating the oscillating rods $e\,e'$ through the media of the arms $f$, links $f'$, and lever D, arranged substantially as herein shown and described.

The above specification of our invention signed by us, this 11th day of October, 1867.

ZINA DOOLITTLE,
A. M. CROWDER.

Witnesses:
JOHN C. HARAN,
JOHN I. MARSHBURY.